United States Patent
Takago et al.

[11] 3,819,563
[45] June 25, 1974

[54] ROOM TEMPERATURE VULCANIZING ORGANOPOLYSILOXANE COMPOSITIONS

[75] Inventors: Toshio Takago, Annaka; Tamio Sato, Takasaki; Hisashi Aoki, Annaka, all of Japan

[73] Assignee: Shinetsu Chemical Company, Tokyo, Japan

[22] Filed: July 12, 1973

[21] Appl. No.: 378,391

[30] Foreign Application Priority Data
July 14, 1972 Japan.............................. 47-70626

[52] U.S. Cl. ...................... 260/37 SB, 260/46.5 G
[51] Int. Cl. ...................... C08g 51/04, C08g 31/02
[58] Field of Search........................... 260/37, 46.5 G

[56] References Cited
UNITED STATES PATENTS
3,664,997  5/1972  Chadha et al.............. 260/46.5 G X
3,689,454  9/1972  Smith et al.................... 260/46.5 G Primary Examiner—Lewis T. Jacobs
Attorney, Agent, or Firm—Toren, McGeady and Stanger

[57] ABSTRACT

Room temperature vulcanizing organopolysiloxane compositions comprising (1) hydroxyl-endblocked di-organopolysiloxane, (2) alkenyloxysilane, represented by the general formula

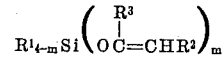

where $R^1$ and $R^3$ are the same or different substituted or unsubstituted monovalent hydrocarbon groups, $R^2$ is a hydrogen atom or a substituted or unsubstituted monovalent hydrocarbon group, and m is 3 or 4, and (3) a vulcanizing catalyst. The compositions are stable under substantially moisture-free conditions but become vulcanized upon exposure to air to form solid elastomers. Being free from generation of poisonous or corrosive gases during vulcanization and well adhesive to most substrates, they are suitable for use as sealing, calking, adhesive and coating materials.

12 Claims, No Drawings

ROOM TEMPERATURE VULCANIZING ORGANOPOLYSILOXANE COMPOSITIONS

FIELD OF THE INVENTION

This invention relates to room temperature vulcanizing organopolysiloxane compositions of one-package system, improved in vulcanizing properties.

DESCRIPTION OF THE PRIOR ART

The so-called room temperature vulcanizing (hereinafter "RTV") organopolysiloxane compositions which are stable in the absence of moisture but, when exposed to moisture-containing air, become vulcanized to form solid elastomeric products are well known. They are classified in two types, i.e., (a) the two package system where their ingredients divided into two groups are stored in two packages, which have to be mixed just prior to use and (b) the one-package system where all the ingredients are mixed and stored in one package and vulcanization takes place only upon exposure of the mixture to air; the mixing step prior to use can be dispensed with.

Particularly useful are the one-package type compositions as sealing and adhesive materials because of simple and convenient handling. Some of them, however, evolve carboxylic acid, such as acetic acid, and the other evolve amine, oxime or alcohol, when they are vulcanized. The acid, amine or oxime evolving type compositions generate poisonous or corrosive gases having very distasteful odor at the time of vulcanization, so that the room in which they are treated has to be well ventilated. More disadvantageously, metallic substrates on which the composition is applied have to be pretreated with a primer against the possible corrosion. Further, although the alcohol evolving type compositions are free from generating poisonous or corrosive gases, they are inferior in storage stability, and disadvantaged by that it takes a long time before they are vulcanized deep inside and the elastomers prepared therefrom will be given fragility and poor mechanical strength. Another known type of RTV organopolysiloxane compositions is one which evolves ketone at the time of vulcanization. This ketone evolving type composition exhibits no adhesivity to metals or plastics.

SUMMARY OF THE INVENTION

It is an object of this invention to provide one-package type room temperature vulcanizing organopolysiloxane compositions, free of the above-described disadvantages of the prior art products.

It is another object of the invention to provide one-package type RTV silicone which exhibits good adhesivity to various substrates without use of a primer.

A further object of the invention is to introduce one-package type RTV silicone which does not evolve poisonous gases at the vulcanization stage and, therefore, is safe to human beings and, at the same time, is free from occurrence of rust when applied to metallic substrates.

A still further object of the invention is to offer one-package type RTV silicone which has a high rate of vulcanization deep into the inner parts of any thick elastomeric products.

Other objects and advantages of this invention will be apparent from the description and claims following.

The composition of the invention comprises
1. 100 parts by weight of a hydroxyl-endblocked diorganopolysiloxane,
2. from 2 to 25 parts by weight of an alkenyloxysilane having the general formula

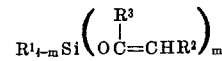

where $R^1$ and $R^3$ are each the same or different substituted or unsubstituted monovalent hydrocarbon groups, $R^2$ is a hydrogen atom or a substituted or unsubstituted monovalent hydrocarbon group, and m is 3 or 4, and
3. a catalytic amount of a vulcanizing catalyst.

This invention is based on the observation of the inventors that a composition comprising a hydroxyl-endblocked diorganopolysiloxane as the main ingredient, an alkenyloxysilane of the above-mentioned formula, and a valcanizing catalyst can be stably stored under substantially moisture-free conditions and further that such composition is readily vulcanized in the air to form solid elastomers without generation of any poisonous gases and bad smell, and still further that it is not corrosive to various substrates, especially metals, but can exhibit good adhesivity to the same surfaces.

Ingredient (1) of the RTV organopolysiloxane composition according to the invention which is a diorganopolysiloxane having endblocking hydroxyl groups, is represented by the average formula

where R is a substituted or unsubstituted monovalent hydrocarbon group, and $a$ is a value of from 1.90 to 2.05. Illustrative of the groups represented by R are alkyl groups, such as methyl, ethyl, propyl, isopropyl, butyl, 2-ethylbutyl and octyl groups; alkenyl groups, such as vinyl, allyl and hexenyl groups; cycloalkyl groups, such as cyclohexyl and cyclopentyl groups; cycloalkenyl groups, such as cyclopentenyl and cyclohexenyl groups; aryl groups, such as phenyl, tolyl, xylyl, naphtyl, xenyl and phenanthryl groups, and subsituted groups thereof; aralkyl groups, such as benzyl and phenylethyl groups; halogenated hydrocarbon groups, such as chloromethyl, trichloropropyl, trifluoropropyl, bromophenyl and chlorocyclohexyl groups, and cyano hydrocarbon groups, such as β-cyanoethyl, γ-cyanopropyl, ω-cyanobutyl and β-cyanobutyl groups.

In order that the resultant elastomers may be endowed with good elasticity as well as excellent mechanical strength, it is required that ingredient (1) should have a viscosity of at least about 25 cs. at 25° C, preferably above 1,500 cs. at 25° C.

Ingredient (2), being an alkenyloxysilane having the above-mentioned general formula, includes its partial hydrolyzate, which is often produced at the formulation of the composition comprising same and sufficiently effective as the ingredient. Examples of ingredient (2) are the following: methyltri(isopropenyloxy)-silane, vinyltri(isopropenyloxy)silane, phenyltri(isopropenyloxy)silane, n-propyltri(isopropenyloxy)silane, tetra(isopropenyloxy)silane, methyltri(1-phenyl-1-ethenyloxy)silane, methyltri(1,2-dimethyl-1-propenyloxy)-silane, and methyltri(1,4-dimethyl-1,3-pentadienyloxy)-silane. These compounds and their partial hydrolyzates act as crosslinking agents in the formulation of the compositions of this invention. The amount of ingredient (2) used in the formulation is from 2 to 25 parts by weight, preferably from 4 to 10 parts by weight, based on 100 parts by weight of ingredient (1). If it is less than 2 parts by weight, gelation is apt to take place at the formulation stage or during storage. On the other hand, if it is above 25 parts by weight, contraction would be increased at the vulcanization stage and the elasticity of the resulting elastomers would be decreased.

The alkenyloxy silane may be prepared by subjecting ketone and halogenosilane compounds to dehydrochlorination in the presence of an organic amine such as triethylamine or dimethylamiline, or metallic sodium, as the acid acceptor and, if necessary, a catalyst such as zinc chloride.

Ingredient (3) used in the invention is a catalyst having a function to promote the vulcanization of the composition of the present invention. Examples of such vulcanizing catalysts are the following: metal salts of organic carboxylic acids, such as lead-di-2-ethyloctoate, dibutyl-tin-diacetate, dibutyl-tin-dilaulate, butyl-tin-tri-2-ethylhexoate, stannous dicapriate, stannous dinaphtate, stannous dioleate, stannous dibutyrate, titanium tetranaphtate, zinc dinaphtate, zinc distearate, zinc-di-2-ethylhexoate, iron-2-ethylhexoate, cobalt-2-ethylhexoate, and manganese-2-ethylhexoate; organic titanium compounds, such as tetrabutyltitanate, tetra-2-ethylhexyltitanate, tetraphenyltitanate, tetraoctadecyltitanate, tetraoctyleneglycoltitanate, tetraorganosiloxytitanate, and dialkoxytitanium bisacetylacetonate; tetraalkenyloxytitanium, such as tetraisopropenoxytitanium, tetra-1,2-dimethyl-1-propenoxytitanium, and tetra-1-methyl-1-propenoxytitanium; alminiumalkoxide, such as aluminiumtriisopropoxide; aminoalkyl-substituted alkoxysilanes, such as γ-aminopropyl triethoxysilanes and N-triemthoxysilylpropyl ethylenediamine; amines, such as n-hexylamine, dodecylamine phosphate, and benzyltriethylamine acetate; ammonium salts; quaternary ammonium salts; and alkaline metal carboxylate, such as potassium acetate, sodium acetate, and dilithium oxalate.

Among the above-listed vulcanizing catalysts particularly effective in both vulcanization promoting and adhesivity improving functions are aminoalkyl-substituted alkoxysilanes, amines, ammonium salts, quaternary ammonium salts, alkaline metal carboxylate, and tetraalkenyl oxytitanium. Further among these, the last-mentioned tetraalkenyl oxytitanium is most effective. It may be produced by reacting dialkenyl oxymercury with titanium tetrachloride.

The amount of ingredient (3) used according to the invention should be in the range of from 0.01 to 10 parts by weight, preferably from 0.1 to 1.0 parts by weight, based on 100 parts by weight of ingredient (1). If it is smaller, the inside vulcanization and the adhesivity of the resulting elastomers would be reduced. On the other hand, if it is greater, the composition to be formulated would result in an increased viscosity, impairment of storage stability and deterioration of the various properties as the vulcanized elastomer products. Besides, the greater content of ingredient (3) would tend to have catalytic effect in themselves to cause decomposition of the siloxane chains of ingredient (1) and also to give harmful effect on human bodies.

In addition to ingredients (1), (2) and (3) above, various fillers can be used, if necessary. Such fillers include metallic oxides, such as pulverized silica, silica aerogels, precipitated silica, diatomaceous earth, quartz flour, ferric oxide, zinc oxide, and titanium oxide; metallic carbonates, such as calcium carbonate, magnesium carbonate and zinc carbonate; asbestos, glass wool, carbon black, powdery mica, fume silica, polystyrene, polyvinyl chloride powder, and polypropylene. The amount of the filler or fillers used in the composition are not critical, but usually no more than 100 parts by weight, preferably between 5 and 30 parts by weight, with reference to 100 parts by weight of ingredient (1).

The compositions of this invention can also contain pigments and dyes as well as such agents that serve to inhibit aging, oxidation or electrostatic charge, retard inflammation or improve thermal conduction. Such flame-retarding and thermal conduction-improving agents are exemplified by antimony oxide and chlorinated paraffins and boron nitride, respectively. Also, such other additives as the so-called carbon functional silanes, containing amino, epoxy or mercapto groups, metallic salts of organic carboxylic acids, and metal alcoholates, can be employed.

In order to obtain the compositions of the invention, ingredients (1), (2) and (3), fillers and other additives as described above are uniformly blended in a dried air or nitrogen atmosphere. The compositions thus obtained, when applied to substrates and exposed to moisture-containing air, become vulcanized and adhere to the substrates. The compositions may be diluted, if desired, with such a solvent as toluene or petroleum ether in an amount of from 50 to 200 parts by weight based on 100 parts by weight of ingredient (1), and the resulting dilution can be applied to the substrates by means of spray or brush.

The compositions of the present invention are stable in the absence of water, but quickly vulcanized upon exposure to the air which contains water, exhibiting good adhesivity to numerous substrates, particulary metallic surfaces. They are free from evolution of poisonous or corrosive gases at the time of vulcanization, and, due to their adhesive and rust-proof properties, can be suitable for sealing, calking, bonding and coating materials in various fields.

The following examples are illustrative only and should not be construed as limiting the invention. All parts are based on weight.

EXAMPLE 1.

Into a hard glass autoclave of 1 liter capacity were put 100 parts of benzene, 250 parts (2.47 moles) of triethylamine, 232 parts (4.0 moles) of acetone, 1.0 part of anhydrous zinc chloride, and 120 parts (0.8 mole) of methyltrichlorosilane. After the contents were mixed, the temperature was gradually raised up to 105° C, at which temperature the mixture was stirred for 16 hours, during which the pressure inside the autoclave having been 2.3 kg/cm² at the beginning when triethylamine hydrochloride was generated became as low as 1.0 kg/cm² at the end when salts were formed. Subsequently, the contents of the autoclave were cooled and filtered in a stream of dried nitrogen gas, resulting to produce 320 parts (2.41 moles) of triethylamine hydrochloride. The filtrate was subjected first to preparatory distillation at 4 mmHg and then to redistillation at 20 mmHg. The distillate obtained at 20 mmHg at 73° C was measured 83 parts (0.39 moles), with the yield of 48% based on the weight of the methyltrichlorosilane. To the distillate thus obtained was added 3 parts of magnesium powder. The mixture was stirred at temperatures of 50° – 60° C and then distillated, to produce a compound, containing almost no Cl⁻ and having a refractive index of 1.4246. The product obtained by this experiment 1 was tested by gaschromatograph, infrared spectra and elementary analysis for silicon and found to be methyltri(isopropenyloxy)silane.

Further, in accordance with the same procedures, the other various isopropenyloxysilanes were prepared by way of experiments 2–5, with the following general reaction.

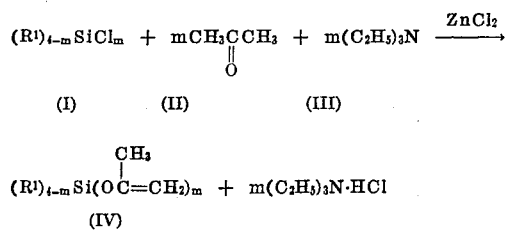

The results of these experiments are shown in the following Table I.

TABLE I

| Experiment No. | 1 | 2 | 3 | 4 | 5 |
| --- | --- | --- | --- | --- | --- |
| (I) Chlorosilane: | | | | | |
| R¹ | $CH_3$ | $CH_2=CH$ | — | $n\text{-}C_3H_7$ | $C_6H_5$ |
| m | 3 | 3 | 4 | 3 | 3 |
| mole | 0.8 | 0.8 | 0.6 | 0.8 | 0.8 |
| (II) Acetone: | | | | | |
| mole | 4.0 | 4.0 | 3.5 | 3.5 | 3.5 |
| (III) Triethylamine: | | | | | |
| mole | 2.47 | 2.47 | 2.47 | 2.47 | 2.47 |
| Reaction conditions: | | | | | |
| Temperature (°C) | 110 | 105 | 108 | 120 | 120 |
| Time (hrs.) | 16 | 8 | 8 | 8 | 8 |
| (IV) Isopropenyloxy- | | | | | |
| silane: | A* | B* | C* | D* | E* |
| Boiling point | | | | | |
| (°C/mmHg) | 73/20 | 63/11 | 94/20 | 75/8 | 90/7 |
| Refractive index | 1.4246 | 1.4358 | 1.4289 | 1.4312 | 1.5069 |

*A : Methyltri(isopropenyloxy)silane
*B : Vinyltri(isopropenyloxy)silane
*C : Tetra(isopropenyloxy)silane
*D : n-Propyltri(isopropenyloxy)silane
*E : Phenyltri(isopropenyloxy)silane

EXAMPLE 2.

Into a round-shaped, three-necked flask of 500 ml capacity, equipped with a filter, a thermometer and a dropping funnel were introduced in the stream of nitrogen gas 62.8 parts of di(isopropenoxy)mercury and 140 parts of isopentane (a solvent). While, to the mixture, a mixture of 30 parts of isopentane and 19.0 parts of titanium tetrachloride was gradually added through the dropping funnel, the content of the flask was refluxed at an elevated temperature to react for 5 hours. The reactant was then cooled and filtered in dried nitrogen gas, to produce a pale yellow liquid. Infrared spectra and elementary analysis for silicon proved that the product was tetra-(isopropenyloxy)-titanium represented by the chemical formula

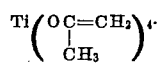

EXAMPLE 3.

100 parts of hydroxyl-endblocked dimethylpolysiloxane, having a viscosity of 10,500 cs. at 25° C, 15 parts of fume silica, and 0.1 part of dibutyl-tin-dilaurate were mixed together. The mixture was kneaded on a three-roll roller and, then, added and mixed under moisture-free conditions with 8 parts of the methyltri(isopropenyloxy)-silane which had been obtained by Example 1, Experiment 1. The mixture was subjected to defoaming treatment. The resulting product composition was proved to be stable in a sealed condition for 1 year, but once exposed to air, released acetone and became vulcanized, to form a rubber elastomer in a short time.

Next, in order to see the adhesivity of the above product composition and the properties of the vulcanized elastomers, the composition was coated in 2 mm depth on a glass sheet, and such test piece was allowed to stand in the atmosphere of 60% relative humidity at 23° C. The results are shown in Table 2 to follow. Further, to know the corrosiveness of the composition to metals, the composition was applied in 2 mm depth on a copper sheet and allowed to stand in similar conditions; whereupon, the vulcanized matters were stripped off the test piece, to observe by naked eyes any occurrence of rust on the surface. The results are also given in the table, under Experiment 6.

For comparative purposes, Experiments 7 – 10 were carried out in similar procedures to Experiment 6 except that the methyltri(isopropenyloxy)silane was replaced with 8 parts of methyltri(acetoxy)silane in Experiment 7, 8 parts of methyltri(acetoneoxime)silane in Experiment 8, a mixture of 8 parts of vinyltri(methoxy)silane and 0.2 part of tetrapropoxytitanate in Experiment 9, and 8 parts of methyltri(n-butylamino)silane in Experiment 10. Their respective results are shown in the same table.

For illustration of the data to be contained in the table, the measurements of tensile strength and elongation of the test pieces after lapse of 14 days in the adhesivity tests, were made in accordance with Japanese Industrial Standard (JIS) A-5755-5-4, and similar measurements of test pieces after immersion in water were made on test pieces which had been prepared in accordance with JIS A-5755 and then immersed in boiling water at 100° C for 24 hours and thereafter cooled for 1 hour. The properties of the vulcanized elastomer were measured in accordance with JIS C-2123-8.9.

Furthermore, it was observed that the innermost part of the silicone composition of the present invention had become a uniform, rubber-like elastomer after a short vulcanization time, compared to those compositions shown in the comparative experiments 7, 8, 9 and 10.

EXAMPLE 4.

100 parts of hydroxyl-endblocked dimethyl-polysiloxane, having a viscosity of 1,500 cs. at 25° C were mixed with 0.5 part of γ-aminopropyltri(ethoxy)-silane and 5 parts of the vinyltri(isopropenyloxy)silane of Example 1, Experiment 2, under moisture free conditions, to prepare the composition of the invention. This composition was stable for over 1 year under a sealed condition, but became vulcanized upon exposure to air in a short time, while releasing acetone. Test pieces then prepared by this experiment (No. 11) in a similar manner to Example 3 with copper and brass sheets were subjected to tests for adhesivity and corrosion, to observe favorable results.

EXAMPLE 5.

100 parts of hydroxyl-endblocked dimethylpolysiloxane (10 mole % in terms of diphenyl), having a viscosity of 100,000 cs. at 25° C, were added 20 parts of fume silica and 1.0 part of cobalt naphthenate. The mixture was kneaded on a three-roll roller and then added and mixed with 8 parts of the tetra(isopropenyloxy)silane of Example 1, Experiment 3 under moisture-free conditions. The resulting product was subjected to defoaming treatment, to obtain the composition of the invention. This composition proved to be stable for more than 1 year under a sealed condition, but become vulcanized upon exposure to air in a short time, while evolving acetone. The Table II to follow hereinafter shows the results of similar tests on the test pieces prepared with the composition, under Experiment 12.

EXAMPLE 6.

100 parts of hydroxyl-endblocked dimethylpolysiloxane, having a viscosity of 23,000 cs. at 25° C was added 17 parts of fume silica and 0.5 part of n-hexylamine. To the mixture which was then kneaded on a three-roll roller, were added and mixed 10 parts of the propyltri(isopropenyloxy)-silane of Example 1, Experiment 4 under moisture-free conditions. The resulting product was subjected to defoaming treatment, to obtain the finished composition. This composition proved to the stable for more than 1 year under sealed conditions, but become vulcanized upon exposure to air in a short while, evolving acetone. Table II to follow hereinafter shows the results of tests on the test pieces prepared with the composition, under Experiment 13.

EXAMPLE 7.

100 parts of hydroxyl-endblocked dimethylpolysiloxane, having a viscosity of 37,000 cs. at 25° C was added 20 parts of carbon black and 0.5 part of tetrabutoxytitanate under sealed conditions. To the mixture which was then kneaded on 3 rolls were added 10 parts of the phenyltri(isopropenyloxy)silane. The resulting product was subjected to defoaming treatment, to obtain the finished composition. This composition proved to be stable for more than 1 year under sealed conditions, but become vulcanized upon exposure to air in a short while, evolving acetone. The test results on the test pieces prepared with the composition are shown in Table II under Experiment 14.

Here follows Table II.

TABLE II

| | Adhesivity test | | | | Occurrence of rust | Properties of vulcanized elastomer | | |
|---|---|---|---|---|---|---|---|---|
| | After lapse of 14 days | | After immersion in water | | | | | |
| | Tensile strength (kg/cm²) | Elongation (%) | Tensile strength (kg/cm²) | Elongation (%) | | Hardness | Elongation (%) | Tensile strength (kg/cm²) |
| Exp. 6 | 11.3 * | 185 | 10.7 * | 230 | No | 23 | 385 | 21 |
| do. 7 | 10.5 * | 163 | 8.5 ** | 140 | Yes | 25 | 350 | 23 |
| do. 8 | 11.0 * | 130 | 0 ** | 0 | Yes | 30 | 290 | 19 |
| do. 9 | 10.3 * | 146 | 0 ** | 0 | No | 22 | 300 | 16 |
| do. 10 | 8.4 * | 130 | 3.2 ** | 40 | Yes | 27 | 340 | 20 |
| do. 12 | 13.0 * | 480 | 14.1 * | 530 | No | 20 | 680 | 23 |
| do. 13 | 11.5 * | 180 | 10.6 * | 210 | No | 26 | 390 | 23 |
| do. 14 | 12.0 * | 220 | 11.6 * | 260 | No | 35 | 380 | 31 |

\* Cured compound broken
\*\* Cured compound partly peeled

EXAMPLE 8.

This example will submit Experiments 15, 16 and 17 in which the tetra(isopropenyloxy)titanium as the vulcanizing catalyst prepared in Example 2 was employed and, for purposes of comparison, Experiment 18 in which dibutyl-tin-dilaurate (as the vulcanizing catalyst) and methyltri(acetoxy)silane (as the crosslinking agent) were employed. Each experiment is described in the following.

EXPERIMENT 15.

100 parts of hydroxyl-endblocked dimethylpolysiloxane having a viscosity of 15,100 cs. at 25° C, 15 parts of fume silica (specific surface area: 200 m²/g) whose surface was treated with siloxane, 0.2 part of the tetra(isopropenyloxy)titanium of Example 2, and 6.0 parts of methyltri-(isopropenyloxy)silane of Example 1, Experiment 1 were kneaded in the absence of moisture and then defoamed under the pressure of 3 mm Hg. The product obtained proved to be stable for more than 6 months when sealed against access of air, but once it was exposed to the air, it became vulcanized while evolving acetone. It was spread 2 mm thick over various substrates and allowed to stand at 23° C under the relative humidity of 60% for 7 hours. The resulting vulcanized product exhibited the properties and adhesion to the substrates as given in Tables III and IV, to follow hereinafter.

EXPERIMENT 16.

100 parts of hydroxyl-endblocked methylvinylpolysiloxane (vinyl content: 5 mole %) having a viscosity of 6,580 cs. at 25° C and 10 parts of finely divided silica (specific surface area: 150 m²/g) were mixed, and passed once through 3 rollers. To the mixture 8.0 parts of vinyltri(isopropenyloxy)silane and 0.4 part of tetra(isopropenyloxy)titanium of Example 2 were added and blended together. The mixture thus prepared was defoamed under the pressure of 4 mm Hg for 5 minutes and subjected to the process described in Experiment 15. The vulcanized product obtained proved to possess the physical properties and adhesion given in Tables III and IV.

EXPERIMENT 17.

100 parts of hydroxyl-endblocked methylphenylpolysiloxane (phenyl content: 10 mole %) having a viscosity of 11,600 cs. at 25° C and 20 parts of fume silica (specific surface area: 200 m²/g) were passed twice through 3 rollers. To this mixture were added in the absence of moisture 10 parts of methyltri(methyl-1-propenyloxy)silane and 10 parts of the tetra(isopropenyloxy)titanium of Example 2. At the start of blending, the mixture showed a little increase in viscosity, but after 10 minutes of stirring, the viscosity was reduced to the initial level. When the mixture was defoamed and processed as described in Experiment 15, it became perfectly vulcanized in 24 hours, and the vulcanized product proved to have the physical properties and adhesivity as given in Tables III and IV.

EXPERIMENT 18.

100 parts of hydroxyl-endblocked diamethylpolysiloxane having a viscosity of 20,000 cs. at 25° C, 15 parts of finely divided silica, and 0.2 part of dibutyltin dilaurate were mixed. The mixture was passed once through 3 rollers. To this mixture, 8.0 parts of methyltriacetoxysilane were added in the absence of moisture and defoamed and vulcanized in the air, while acetic acid was evolved. The adhesion of the product to various substrates were as given in Table IV.

Here follow Tables III and IV.

TABLE III

|  | Exp. 15 | Exp. 16 | Exp. 17 |
| --- | --- | --- | --- |
| Hardness | 25 | 18 | 30 |
| Tensile strength (kg/cm²) | 23 | 16 | 35 |
| Elongation (%) | 425 | 280 | 680 |
| Tear strength (kg/cm) | 7 | 5 | 11 |

Note: The above measurements were conducted in accordance with JIS C-2123-8.9.

TABLE IV

| | Present invention | | | | |
| --- | --- | --- | --- | --- | --- |
| | Exp. 15 | | | Exp. 16 | |
| | Adhesive strength (kg/cm²) | Occurrence of rust | | Adhesive strength (kg/cm²) | Occurrence of rust |
| Glass | 12.0 | Cured compound broken | None | 8.5 | Cured compound broken | None |
| Iron | 11.5 | do. | do. | 8.5 | do. | do. |
| Stainless steel SM 27 | 11.8 | do. | do. | 8.0 | do. | do. |
| Copper | 11.4 | do. | do. | 8.1 | do. | do. |
| Sheet zinc | 10.8 | do. | do. | 8.1 | do. | do. |
| Tin plate | 12.0 | do. | do. | 8.6 | do. | do. |
| Aluminum | 11.2 | do. | do. | 8.5 | do. | do. |
| Polyester resin | 12.0 | do. | do. | 8.0 | do. | do. |
| Epoxy resin | 11.5 | do. | do. | 8.2 | do. | do. |
| Phenolic resin | 11.6 | do. | do. | 8.2 | do. | do. |
| ABS resin | 11.5 | do. | do. | 8.0 | do. | do. |
| Polycarbonate resin | 12.0 | do. | do. | 8.0 | do. | do. |
| Acrylic resin | 12.1 | do. | do. | 7.5 | do. | do. |
| Hard vinyl-chloride resin | 11.8 | do. | do. | 8.3 | do. | do. |
| Ebonite | 11.8 | do. | do. | 8.2 | do. | do. |
| Styrene resin | 6.3 | Partly peeled | do. | 4.5 | Partly peeled | do. |

Remarks) Adhesive strength:
Two test plates (25 × 100 × 1 mm) were bonded, either with one of the compositions of the invention or with the composition prepared as control, in such a way that 10 cm of the end of the longer side of each plate might be left uncovered. Consequently the bonded piece or sample measured 2 mm in thickness in the part where the plates were piled. The sample thus prepared was let to stand at 23°C, 60% RH, for 7 days and then was subjected to the tensile strength test in which the tester was operated at 50 mm/min. The value given was multiplied by 1/2.5 in order to obtain the adhesive strength (kg/cm²) tabulated above.

| | Present invention | | | | |
| --- | --- | --- | --- | --- | --- |
| | Exp. 17 | | | Exp. 18 | |
| | Adhesive strength (kg/cm²) | Occurrence of rust | | Adhesive strength (kg/cm²) | Occurrence of rust |
| Glass | 15.6 | Cured compound broken | None | 11.0 | Cured compound broken | — |
| Iron | 14.8 | do. | do. | 1.5 | Peeled | Yes |
| Stainless steel SM 27 | 13.6 | do. | do. | 2.0 | do. | do. |
| Copper | 14.6 | do. | do. | 0.3 | do. | do. |
| Sheet zinc | 13.5 | do. | do. | 0.5 | do. | do. |
| Tin plate | 14.6 | do. | do. | 7.1 | do. | do. |
| Aluminum | 15.3 | do. | do. | 5.8 | do. | None |
| Polyester resin | 15.0 | do. | do. | 11.4 | Cured compound broken | — |
| Epoxy resin | 15.1 | do. | do. | 11.3 | do. | — |
| Phenolic resin | 15.0 | do. | do. | 11.0 | do. | — |
| ABS resin | 15.0 | do. | do. | 10.6 | do. | — |
| Polycarbonate resin | 15.3 | do. | do. | 11.0 | do. | — |
| Acrylic resin | 12.6 | do. | do. | 1.3 | Peeled | — |
| Hard vinyl-chloride resin | 14.8 | do. | do. | 6.3 | Partly peeled | — |
| Ebonite | 15.0 | do. | do. | 10.8 | Cured compound broken | — |
| Styrene resin | 6.3 | Partly peeled | do. | 0 | Peeled | — |

EXAMPLE 9.

85 parts of hydroxyl-endblocked dimethylpolysiloxane, having a viscosity of 21,000 cs. at 25° C, 15 parts of trimethylsilyl-endblocked dimethylpolysiloxane, having a viscosity of 100 cs. at 25° C, 13 parts of fume silica, having a specific surface area of 150 m²/g and 0.1 part of dibutyltindilaurate were mixed together. The mixture was kneaded on a three-roll roller. A mixture of 7.0 parts of methyltri(isopropenyloxy)silane and 0.5 part of γ-aminopropyltri(ethoxy)silane was added dropwise under stirring to the kneaded mixture obtained above for 10 minutes at room temperature in the stream of nitrogen gas. After such addition, the mixture was subjected to defoaming, to obtain the finished composition. 100 parts of the composition thus obtained were dissolved in 100 parts of toluene, to produce a clear solution. The resulting homogeneous solution was stable in a sealed condition for more than six months. It was coated 2 mm thick on a glass plate and the test plate was allowed to stand in the atomsphare of 60 % relative humidity at 23° C.

After 2 hours the surface of the test plate became dried and the vulcanization was complete after 24 hours to give a rubber like elastomer with releasing of acetone.

What is claimed is:

1. A room temperature vulcanizing organopolysiloxane composition comprising (1) 100 parts by weight of a hydroxyl-endblocked diorganopolysiloxane, (2) from 2 to 25 parts by weight of an alkenyloxysilane having the general formula

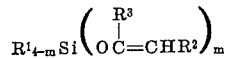

where $R^1$ and $R^3$ are each the same or different substituted or unsubstituted monovalent hydrocarbon groups, $R^2$ is a hydrogen atom or substituted or unsubstituted monovalent hydrocarbon group and m is 3 or 4, and (3) a catalytic amount of a vulcanizing catalyst.

2. The room temperature vulcanizing organopolysiloxane composition as claimed in claim 1 wherein no more than 100 parts by weight, preferably from 5 to 30 parts by weight, based on 100 parts of said ingredient (1), of a filler is contained.

3. The room temperature vulcanizing organopolysiloxane composition as claimed in claim 1 wherein from 50 to 200 parts by weight, based on 100 parts of ingredient (1), of an organic solvent is contained.

4. The room temperature vulcanizing organopolysiloxane composition as claimed in claim 1 wherein said ingredient (1) has a viscosity exceeding 25 cs. measured at 25° C.

5. The room temperature vulcanizing organopolysiloxane composition as claimed in claim 1 wherein said ingredient (1) has a viscosity of 1,500 cs. at 25° C.

6. The room temperature vulcanizing organopolysiloxane composition as claimed in claim 1 wherein said ingredient (1) is dimethylpolysiloxane.

7. The room temperature vulcanizing organopolysiloxane composition as claimed in claim 1 wherein said ingredient (1) is methylphenylpolysiloxane.

8. The room temperature vulcanizing organopolysiloxane composition as claimed in claim 1 wherein said vulcanizing catalyst is used in an amount of from 0.01 to 10 parts by weight, based on 100 parts of said ingredient (1).

9. The room temperature vulcanizing organopolysiloxane composition as claimed in claim 1 wherein said ingredient (2) is an alkenyloxysilane selected from the group consisting of methyltri(isopropenyloxy)silane, tetra(isopropenyloxy)silane, propyltri(isopropenyloxy)silane, phenyltri(isopropenyloxy)-silane, vinyltri(isopropenyloxy)silane, and methyltri-(2-methyl-1-propenyloxy)silane.

10. The room temperature vulcanizing organopolysiloxane composition as claimed in claim 1 wherein said ingredient (3) is a vulcanizing catalyst selected from the group consisting of metal salts of organic carboxylic acids, aluminum alkoxides, aminoalkyl-substituted alkoxysilanes, amines, ammonium salts, quaternary ammonium salts, alkaline metal carboxylate, and tetraalkenyloxy titanium.

11. The room temperature vulcanizing organopolysiloxane compositon as claimed in claim 1 wherein said ingredient (3) is tetraalkenyloxy titanium.

12. The room temperature vulcanizing organopolysiloxane composition as claimed in claim 1 wherein at least one filler selected from the group consisting of metallic oxides, metallic hydrocarbonates, asbestos, glass wool, carbon black, powdery mica, fume silicas, polystyrene, polyvinyl chloride powder, and polypropylene is contained.

* * * * *